United States Patent
Bae et al.

(10) Patent No.: US 6,771,452 B2
(45) Date of Patent: Aug. 3, 2004

(54) ACTUATOR OF DISC DRIVE HAVING SHOCK DAMPING DEVICE

(75) Inventors: Byoung-young Bae, Pyoungtag (KR); Young-min Cheong, Seoul (KR); Soon-kyo Hong, Seoul (KR)

(73) Assignee: Samsung Electronics Co., LTD, Suwon-si (KR)

( * ) Notice: Subject to any disclaimer, the term of this patent is extended or adjusted under 35 U.S.C. 154(b) by 303 days.

(21) Appl. No.: 09/977,988

(22) Filed: Oct. 17, 2001

(65) Prior Publication Data

US 2002/0071197 A1 Jun. 13, 2002

(30) Foreign Application Priority Data

Dec. 12, 2000 (KR) ........................................ 2000-75406

(51) Int. Cl.[7] ............................................ G11B 21/02
(52) U.S. Cl. ...................................................... 360/75
(58) Field of Search ................................ 360/75, 77.03, 360/60, 78.05, 97.02, 98.01, 264.9, 244.9, 31, 264.3, 244.2, 244.3; 369/75.1, 75.2, 77.1, 77.2, 244, 246, 247

(56) References Cited

U.S. PATENT DOCUMENTS

| | | | | |
|---|---|---|---|---|
| 4,751,595 A | * | 6/1988 | Kishi et al. ............... | 360/256.3 |
| 4,954,904 A | * | 9/1990 | Goor ........................ | 360/294.7 |
| 4,985,793 A | * | 1/1991 | Anderson ................. | 360/256.2 |
| 5,004,080 A | * | 4/1991 | Wada ....................... | 188/282.4 |
| 5,208,712 A | * | 5/1993 | Hatch et al. .............. | 360/98.01 |
| 5,258,971 A | * | 11/1993 | Yamamoto et al. ......... | 369/219 |
| 5,303,101 A | * | 4/1994 | Hatch et al. ................. | 360/256 |
| 5,373,213 A | * | 12/1994 | Smith ........................ | 310/355 |
| 5,491,598 A | * | 2/1996 | Stricklin et al. ......... | 360/265.6 |
| 5,528,437 A | * | 6/1996 | Mastache ................. | 360/256.4 |
| 5,535,074 A | * | 7/1996 | Leung ..................... | 360/265.9 |
| 5,594,607 A | * | 1/1997 | Erpelding et al. ....... | 360/244.3 |
| 5,606,477 A | * | 2/1997 | Erpelding et al. ....... | 360/244.3 |
| 5,734,527 A | * | 3/1998 | Reinhart .................. | 360/256.2 |
| 5,808,838 A | * | 9/1998 | Battu et al. .............. | 360/264.8 |
| 5,835,310 A | * | 11/1998 | Battu et al. .............. | 360/264.7 |
| 5,864,444 A | * | 1/1999 | Baker et al. ............. | 360/265.9 |
| 5,872,688 A | * | 2/1999 | Battu et al. .............. | 360/264.7 |
| 5,943,191 A | * | 8/1999 | Giere et al. .............. | 360/244.9 |
| 6,018,431 A | * | 1/2000 | Carlson et al. ............... | 360/60 |
| 6,477,000 B1 | * | 11/2002 | Pottebaum et al. ...... | 360/97.02 |
| 6,542,326 B1 | * | 4/2003 | Ell et al. .................. | 360/78.05 |
| 6,556,383 B2 | * | 4/2003 | Murphy et al. .......... | 360/244.9 |

* cited by examiner

*Primary Examiner*—David Hudspeth
*Assistant Examiner*—Fred F. Tzeng
(74) *Attorney, Agent, or Firm*—Staas & Halsey LLP

(57) ABSTRACT

An actuator of a disc drive having a shock damping device includes an electro-magnet disposed on a cover of the disc drive, a magnetic material disposed on a load beam of the actuator, opposite to the electro-magnet, and a driving control portion controlling a driving of the electro-magnet by detecting an vibration of the load beam towards and away from an optical disc that is caused by an external shock. When the load beam is vibrated by the external vibration or shock to the disc drive, electricity is supplied to the electro-magnet, securing the load beam to the cover until the vibration ceases. Accordingly, even when there is external vibration or shock applied to the disc drive, possible damage to the disc or the actuator can be minimized or prevented.

20 Claims, 6 Drawing Sheets

PRIOR ART

PRIOR ART

ACTUATOR OF DISC DRIVE HAVING SHOCK DAMPING DEVICE

CROSS REFERENCE TO RELATED APPLICATION

This application claims the benefit of Korean Patent Application No. 2000-75406 filed on Dec. 12, 2000 in the Korean Industrial Property Office, the disclosure of which is incorporated herein by reference.

BACKGROUND OF THE INVENTION

1. Field of the Invention

The present invention relates to a disc drive used as an auxiliary memory for a device such as, for example, a computer, and more particularly to an actuator of the disc drive to fly an optical head or a magnetic head toward a disc to record and/or reproduce information to and/or from the disc.

2. Description of the Related Art

Generally, among disc drives used by a user to record and/or reproduce information onto/ from discs, a hard disc drive is especially used in personal computers as an auxiliary memory. The hard disc drive, as generally known, uses a magnetic recording principle that records and/or reproduces desired information by axially moving an optical head on a disc that is coated with a magnetic material.

Meanwhile, there has been growing demands for compact-sized hard disc drives that can be employed in portable appliances such as laptop computers, digital cameras, or the like, and also in larger memory capacity devices. In order to satisfy such demands, an optical recording and/or reproducing method has been employed instead of the magnetic recording method.

FIG. 1 is a view schematically showing an example of a conventional hard disc drive, in which an upper cover (not shown) is opened. As shown in FIG. 1, in the conventional hard disc drive, a ring-shaped magnetic disc 10 is mounted on a rotary shaft 30 of a spindle motor (not shown) that is mounted on a base 20. The magnetic disc 10 is rotated on the rotary shaft 30 of the spindle motor at a high speed. Also, an actuator 100, for which a magnetic or optical head slider (h) is attached to a leading-end thereof, is mounted on an edge of the base 20 to be pivoted on a pivot (p) by driving of a voice coil motor (VCM) 110.

The actuator 100 includes a swing arm 120 connected to the pivot (p), and a load beam 130 connected to the swing arm 120. The lower end of the load beam 130 is connected to an elastic member, i.e., a flexure 140, while the head slider (h) is mounted on a leading end of the flexure 140.

As shown in FIG. 2, the head slider (h) is floated from adjacent to the disc 10 by a predetermined height distance, by air current produced by rapid rotation of the disc 10 during the driving of the hard disc drive. In a state that the optical head slider (h) is floated adjacent to the disc 10, the head slider (h) is moved across the disc 10 toward the inner side of the disc 10 by pivoting of the actuator 100, and reproduces recorded data from the disc 10 or records new data on the disc 10. Reference numeral 40 refers to a cover of the disc drive.

According to the above mentioned conventional hard disc drive, if external shock or vibration is applied to the hard disc drive in operation, as shown in FIG. 3A, the load beam 130 vibrates in a bending motion towards and away from the disc 10. Due to the vibration, the load beam 130 collides with the cover 40 (see FIG. 3A), and the head slider (h) collides with the disc 10, as shown in FIG. 3B, repeatedly. Accordingly, there can be damage caused to the data stored in the recording surface of the disc 10, or damage to the actuator 100. Especially for disc drives employed in the portable appliances such as laptop personal computers, camcorders, digital cameras, or the like, which are more frequently subject to the external vibration or shock, there is a high possibility of damage to the disc 10 and the actuator 100.

SUMMARY OF THE INVENTION

Accordingly, it is an object of the present invention to provide an actuator to be used with a device such as a disc drive that has a shock damping device to dampen the vibration of a load beam caused by external shock to the device.

Additional objects and advantages of the invention will be set forth in part in the description which follows and, in part, will be obvious from the description, or may be learned by practice of the invention.

The above and other objects are accomplished by providing an actuator to be used with a disc drive having a shock damping device in accordance with the present invention, including an electro-magnet disposed on a cover of the disc drive, a magnetic material disposed on a load beam of the actuator and opposite to the electro-magnet, and a driving control portion that controls a driving of the electro-magnet by detecting an upward and downward vibration of the load beam that is caused by external shocks.

The driving control portion includes an interference sensor disposed on the cover, and an interference member disposed on the load beam, opposite to the interference sensor.

According to another aspect of the present invention, the driving control portion includes a timing switch to adjust a time for supplying electricity to the electro-magnet. Meanwhile, the driving control portion controls the timing switch in a manner such that the electricity is supplied to the electro-magnet for a predetermined time when an amplitude of vibration of the load beam is detected to be out of a predetermined range of amplitude of vibration.

According to still another aspect of the present invention, there is provided an insulating material disposed between the interference member and the load beam. Thus, when the load beam is vibrated by external vibration or shock to the disc drive, electricity is supplied to the electro-magnet, securing the load beam to the cover until the vibration ceases. Accordingly, even when there is external vibration or shock applied to the disc drive, possible damage to the disc or the actuator can be prevented.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE INVENTION

Figure 1:
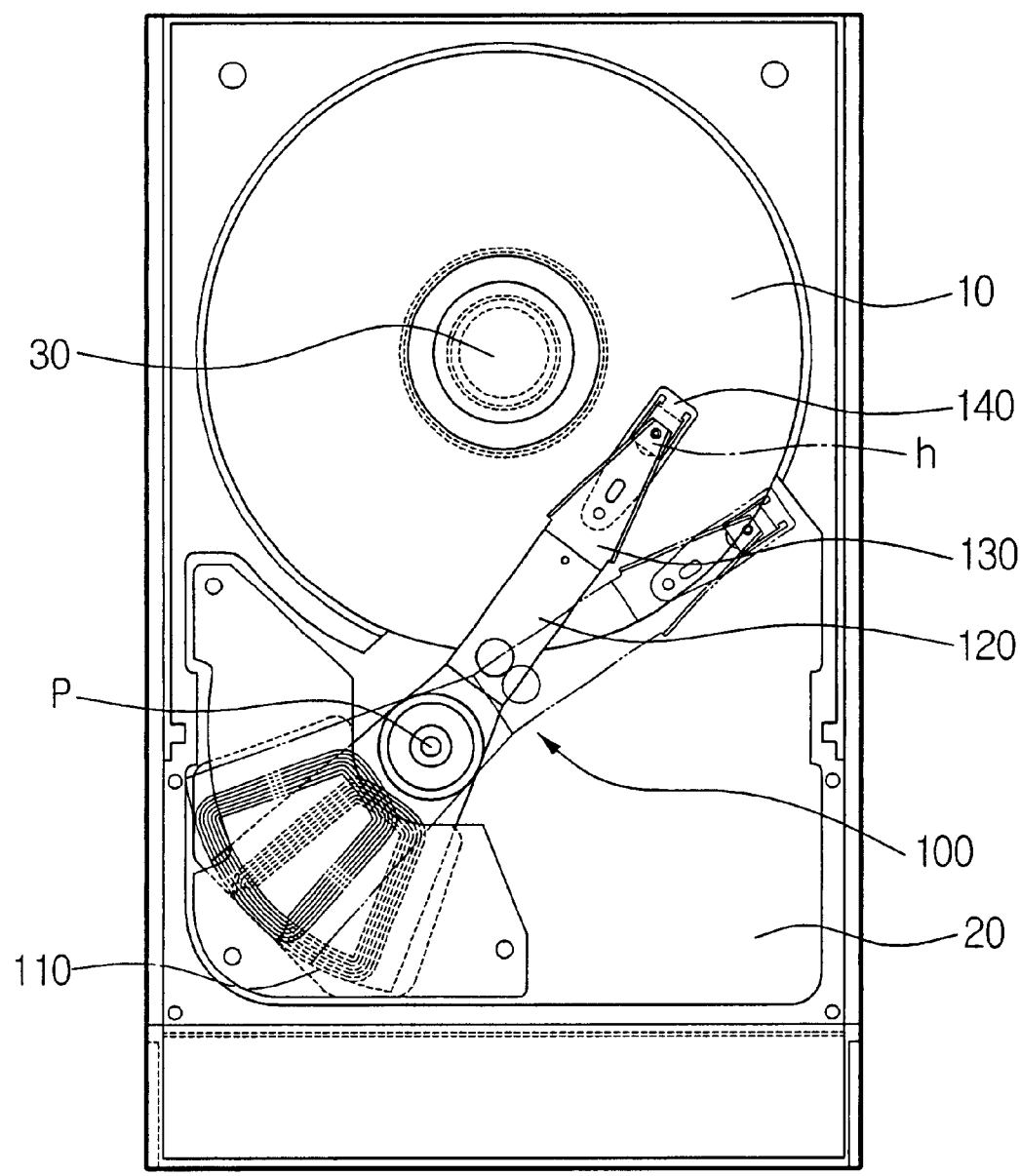
FIG. 1 is a plan view schematically showing a conventional hard disc drive from which a cover is opened.
Figure 2:
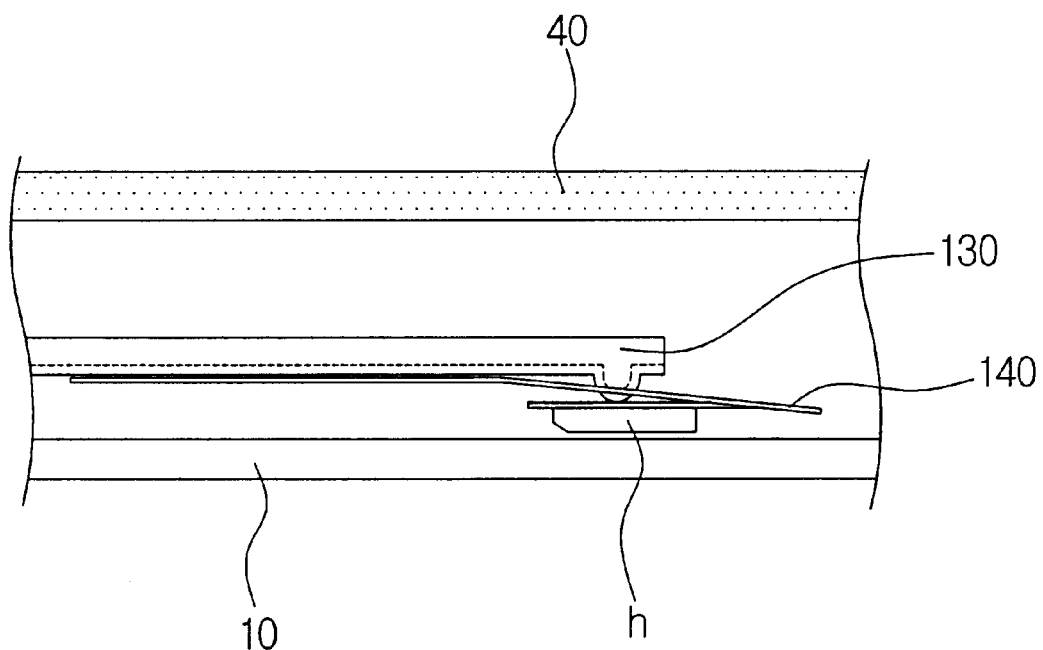
FIG. 2 is an enlarged side view of the conventional hard disc drive showing a main portion of the actuator.
Figure 3A:
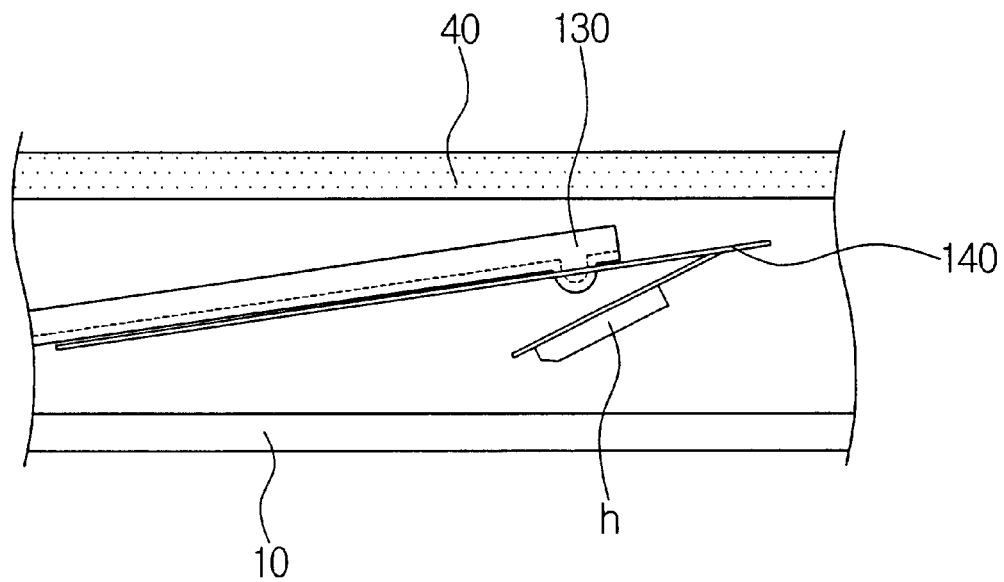
FIGS. 3A and 3B are side sectional views showing the operation of the actuator of FIG. 2.
Figure 3B:
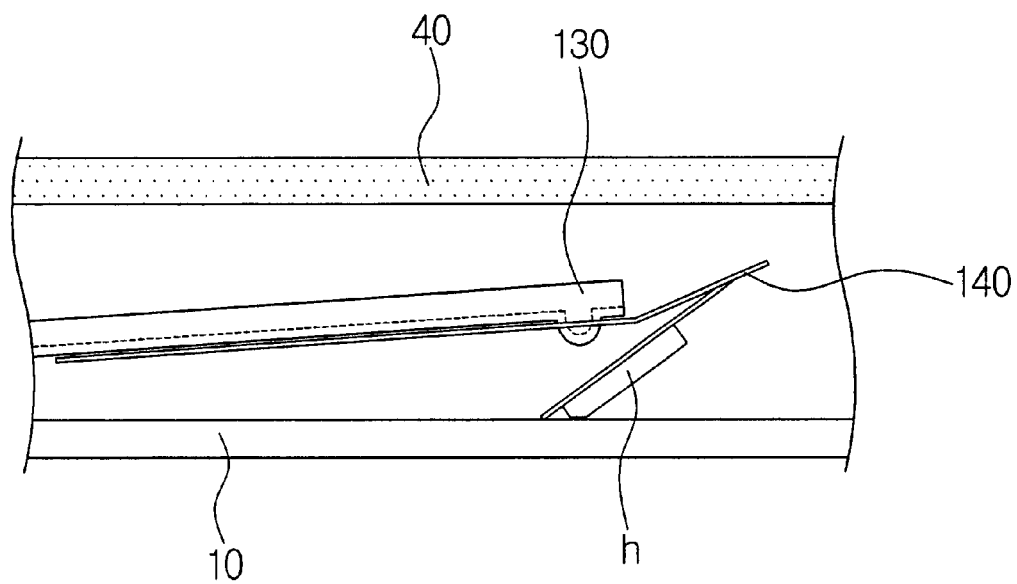

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 4:
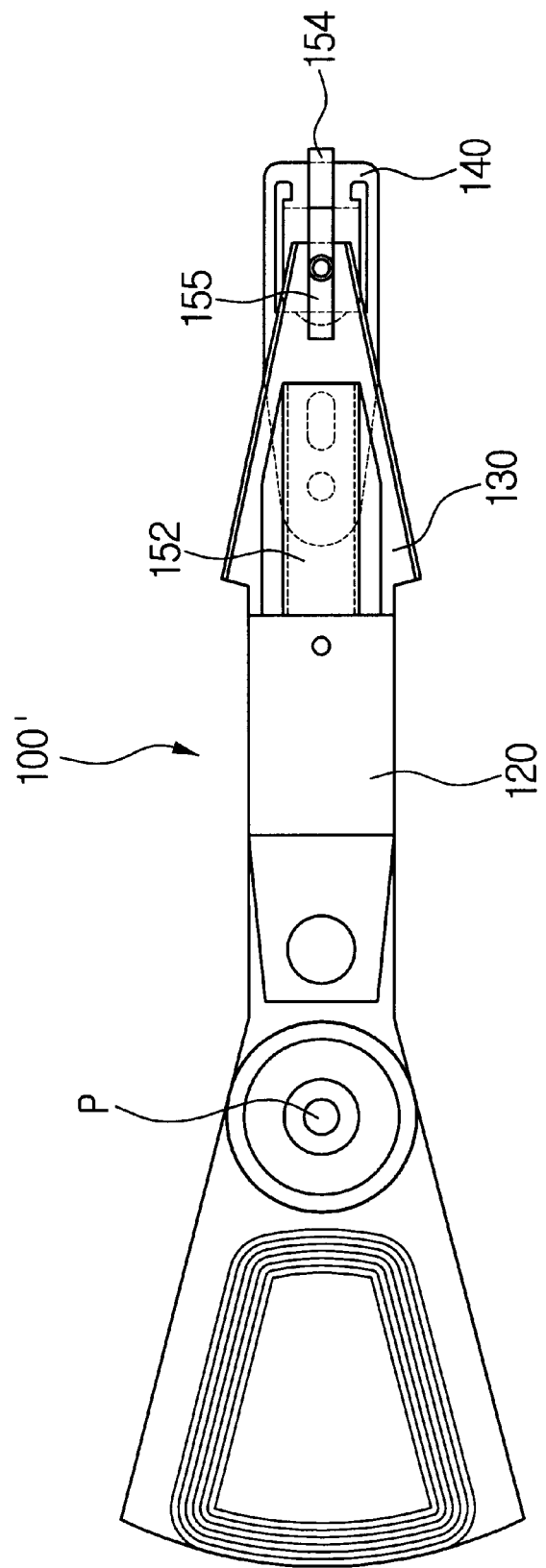
FIG. 4 is a plan view schematically showing an actuator of a disc drive in accordance with the present invention.

As shown in FIG. 4, an actuator 100' of a disc drive in accordance with the present invention includes a swing arm 120 connected to a pivot (p), a load beam 130 connected to the swing arm 120, and a flexure 140 mounted on a lower leading end of the load beam 130. Similarly to the conventional system of FIGS. 1–3B, the optical head slider (h) of the present invention may be mounted on the leading end of the flexure 140. However, the actuator of the present invention distinguishes from the conventional system by having a shock damping device that damps back and forth vibration of the load beam 130 caused by external shock thereto.

Figure 5:
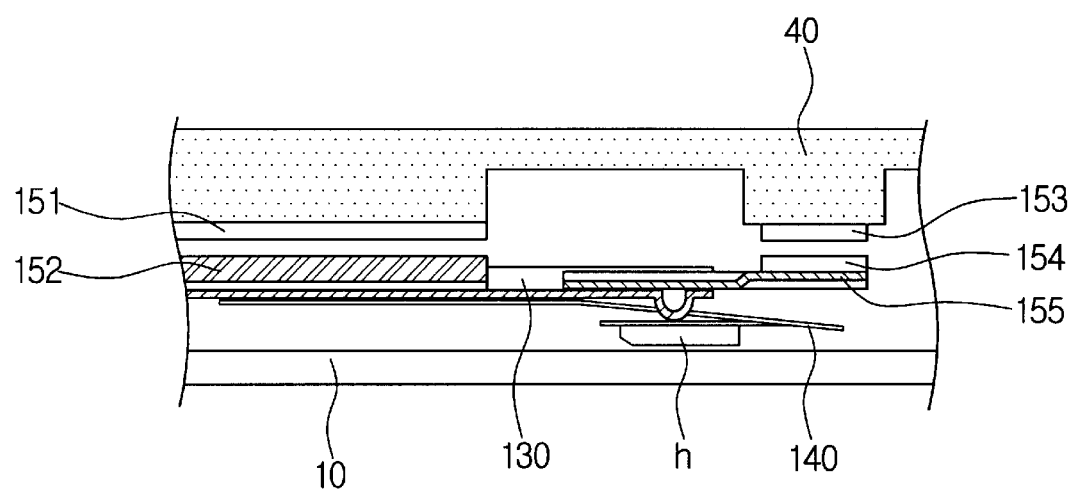
FIG. 5 is an enlarged side view of the main portion of the actuator of the disc drive in accordance with the present invention.

As shown in FIG. 5, the shock damping device includes an electro-magnet 151 disposed on a lower surface of the cover 40 of the disc drive, a magnetic material 152 disposed on an upper surface of the load beam 130 opposite to the electro-magnet 151, and a driving control portion that detects vibration of the load beam 130 toward and away from an optical disc 10, and in response, controls the driving of the electro-magnet 151.

The driving control portion includes an interference sensor 153 disposed on the lower surface of the cover 40, and an interference member 154 disposed on the leading end of the load beam 130 opposite to the interference sensor 153. Here, the interference sensor 153 may be a contact sensor, or a noncontact sensor such as a photo-sensor. In this embodiment, the contact sensor is used as the interference sensor 153, which detects vibration of the load beam 130 through the contact with the interference member 154. Meanwhile, the driving control portion preferably includes a timing switch (not shown) that adjusts a time to supply electricity to the electro-magnet 151.

The driving control portion, constructed as described above, controls the timing switch so that electricity is supplied to the electro-magnet 151 for a predetermined amount of time when it is detected that the amplitude of vibration of the load beam 130 is out of a predetermined range of amplitude of vibration.

A circuit to be used with the interference sensor 153, electro-magnet 151, and the timing switch of the driving control portion is designed such that the electro-magnet 151 is driven for the predetermined period of time in response to interference signals output from the interference sensor 153 when contact is made between it and the interference member 154. Any preferred or well known circuit that will provide the required connection between the drive control portion, the interference sensor 153, the electro-magnet 151, and the timing switch can be used, and therefore a separate description thereof will be omitted.

The magnetic material 152 can be made from materials such as, for example, a general steel plate or a permanent magnet. If a permanent magnet is used, the magnetic material 152 is controlled to have opposite polarities on both ends of the permanent magnet, thereby generating a magnetic attraction between the electro-magnet 151 and the magnetic material 152 at lower electricity.

In order to prevent the electricity supplied to the electro-magnet 151 from flowing to the load beam 130 to influence the optical or magnetic elements of the optical head slider (h), it is preferable to provide an insulator 155 between the interference member 154 and the load beam 130.

The process of damping vibrations and shock at the actuator of the disc drive constructed as above in accordance with the present invention will now be described below.

As shown in FIG. 5, the optical head slider (h) is moved in a state of being floated adjacent to the disc 10 at a predetermined distance therefrom by the air current generated from rapid rotation of the disc 10 during the driving of the hard disc drive, to reproduce data stored in the disc 10 or record new data on the disc 10. At this time, the load beam 130 is at a horizontal position parallel with the disk 10.

Figure 6A:
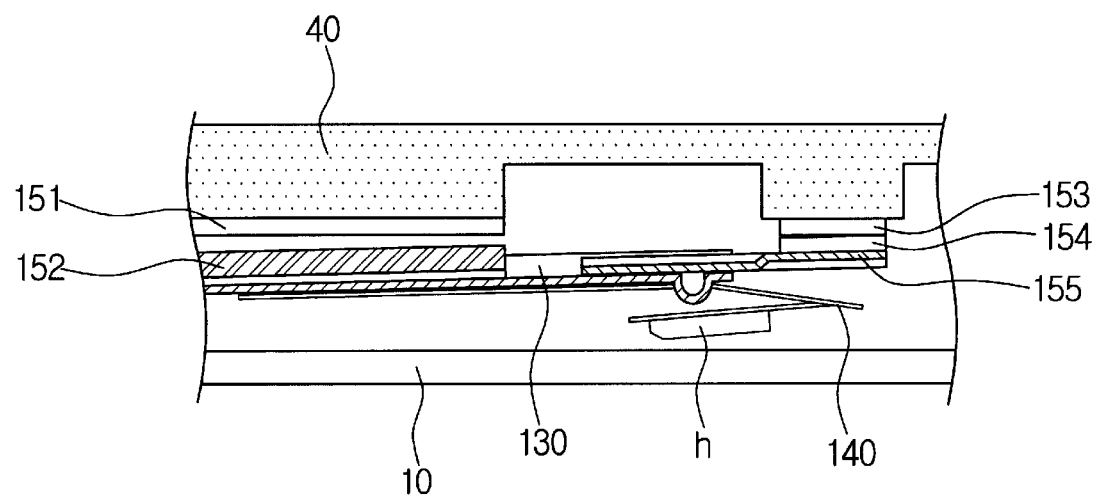
FIGS. 6A and 6B are side sectional views showing the operation of the actuator of FIG. 5.

In this situation, when external vibration or shock is exerted on the hard disc drive, the load beam 130 is bent and vibrates towards and away from the disc 10, and as shown in FIG. 6A, when the load beam 130 is bent away from the disc 10, the interference member 154 formed on the leading end of the load beam 130 contacts the interference sensor 153, and thereby supplies electricity to the electro-magnet 151 and hence the timing switch.

Figure 6B:
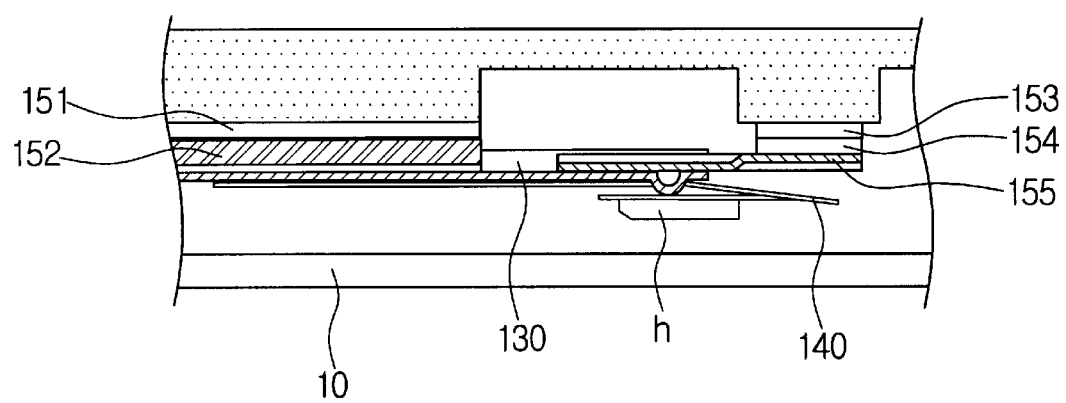

When the electro-magnet 151 is supplied with electricity, there is generated a magnetic attraction between the electro-magnet 151 and the magnetic material 152. Under the magnetic attraction, as shown in FIG. 6B, the load beam 130 becomes secured to the cover 40, and thus vibration of the load beam 130 is prevented.

Meanwhile, after a predetermined amount of time from the supply of electricity to the electro-magnet 151, i.e., by the time that the vibration of the load beam 130 by the external shock is damped completely, the timing switch gradually decreases the electricity supply. Accordingly, the electro-magnet 151 and the magnetic material 152 are gradually separated from each other, and the load beam 130 is returned to the horizontal position.

Although the optical head slider (h) is flying above the disc 10 when recording or reproducing information to or from the disc 10 in the above-described embodiment, another method may be implemented. For example, the electro-magnet 151 and the interference sensor 153 alternatively may be mounted on the base 20, and thus the optical head slider (h) then flies under the disc 10. In this set up, instead of being disposed on the load beam 130, the magnetic material 152 may be disposed on the swing arm 120, while the electro-magnet 151 is disposed on the base 20 opposite to the magnetic material 152.

As described above, in the disc drive actuator in accordance with the present invention, when the vibration of the load beam 130 towards and away from the disc 10 is detected by the interference sensor 153, electricity is supplied to the electro-magnet 151, and the load beam 130 becomes secured to the cover 40 until the vibration ceases. Accordingly, even when external vibration or shock is applied to the disc drive, possible damages to the disc 10 or the actuator 100' are minimized or prevented.

Although a few embodiments of the present invention have been shown and described, it will be appreciate by those skilled in the art that changes may be made in these embodiments without departing from the principle and spirit of the invention, the scope of which is defined in the appended claims and their equivalents.

What is claimed is:

1. An actuator of a disc drive having a cover and a load beam and usable with a disc, the actuator comprising:
   an electro-magnet disposed on the cover of the disc drive;
   a magnetic material disposed on the load beam of the actuator, opposite to the electro-magnet; and
   a driving control portion controlling a driving of the electro-magnet by detecting vibration of the load beam toward and away from the disc, said vibration being caused by an external shock.

2. The actuator of claim 1, wherein the driving control portion comprises:
   an interference sensor disposed on the cover; and
   an interference member disposed on the load beam, opposite to the interference sensor.

3. The actuator of claim 2, wherein the driving control portion further comprises a timing switch adjusting a time for supplying electricity to the electro-magnet.

4. The actuator of claim 3, wherein the driving control portion controls the timing switch such that the electricity is supplied to the electro-magnet for a predetermined amount of time when an amplitude of vibration of the load beam is detected to be out of a predetermined range of amplitude of vibration.

5. The actuator according to claim 4, wherein the timing switch gradually decreases the electricity to the electro-magnet as the amplitude of vibration decreases.

6. The actuator of claim 2, further comprising an insulating material disposed between the interference member and the load beam.

7. The actuator according to claim 2, wherein the interference sensor comprises a contact sensor.

8. The actuator according to claim 2, wherein the interference sensor comprises a photo-sensor.

9. The actuator according to claim 1, wherein the magnetic material is made from a permanent magnet with opposite polarities on both ends thereof.

10. The actuator according to claim 1, wherein the magnetic material is made from a steel plate.

11. The actuator of claim 1, wherein the driving control portion drives the electro-magnet so that the load beam is secured to the cover in response to the driving control portion determining that the vibration exceeds a predetermined range of amplitude.

12. An actuator of a disc device with a base and a swing arm and usable with a disc, the actuator comprising:
   an electro-magnet disposed on the base;
   a magnetic material disposed on the swing arm, opposite to the electro-magnet; and
   a drive control portion controlling a driving of the electro-magnet by detecting vibration of the load beam toward and away from the disc, said vibration being caused by an external shock.

13. The actuator of claim 12, wherein the driving control portion comprises:
   an interference sensor disposed on the base; and
   an interference member disposed on the swing arm, opposite to the interference sensor.

14. The actuator of claim 13, wherein the driving control portion further comprises a timing switch adjusting a time for supplying electricity to the electro-magnet.

15. The actuator of claim 14, wherein the driving control portion controls the timing switch in a manner such that the electricity is supplied to the electro-magnet for a predetermined amount of time when an amplitude of vibration of the swing arm is detected to be out of a predetermined range of amplitude of vibration.

16. An actuator of a disc drive, the actuator having a swing arm and a load beam and comprising:
   a driving control portion detecting a vibration of at least one of the swing arm and the load beam and determining if the vibration exceeds a predetermined limit; and
   a damping mechanism damping the vibration of at least one of the swing arm and the load beam if the vibration exceeds the predetermined limit.

17. The actuator of claim 16, wherein the driving control portion causes the damping mechanism to secure the at least one of the swing arm and the load beam to a portion of the disc drive if the vibration exceeds the predetermined limit.

18. The actuator of claim 16, wherein the disc drive has a cover, wherein:
   the damping mechanism comprises:
      an electro-magnet disposed on the cover, and
      a magnetic material disposed on the load beam, opposite to the electro-magnet;
   the driving control portion comprising:
      an interference member disposed on the load beam, and
      an interference sensor disposed on the cover, opposite the interference member, detecting whether the interference member is within a predetermined distance.

19. The actuator of claim 16, further comprising a timing switch adjusting a time for supplying electricity to the electro-magnet if the interference member is within the predetermined distance.

20. The actuator of claim 16, wherein the disc drive has a base, wherein:
   the damping mechanism comprises:
      an electro-magnet disposed on the base, and
      a magnetic material disposed on the swing arm, opposite to the electro-magnet;
   the driving control portion comprising:
      an interference member disposed on the swing arm, and
      an interference sensor disposed on the base, opposite the interference member, detecting whether the interference member is within a predetermined distance.

* * * * *